June 13, 1944.  R. S. COLLEY  2,351,404
PATCH APPLYING APPARATUS
Filed Jan. 29, 1941  2 Sheets-Sheet 1
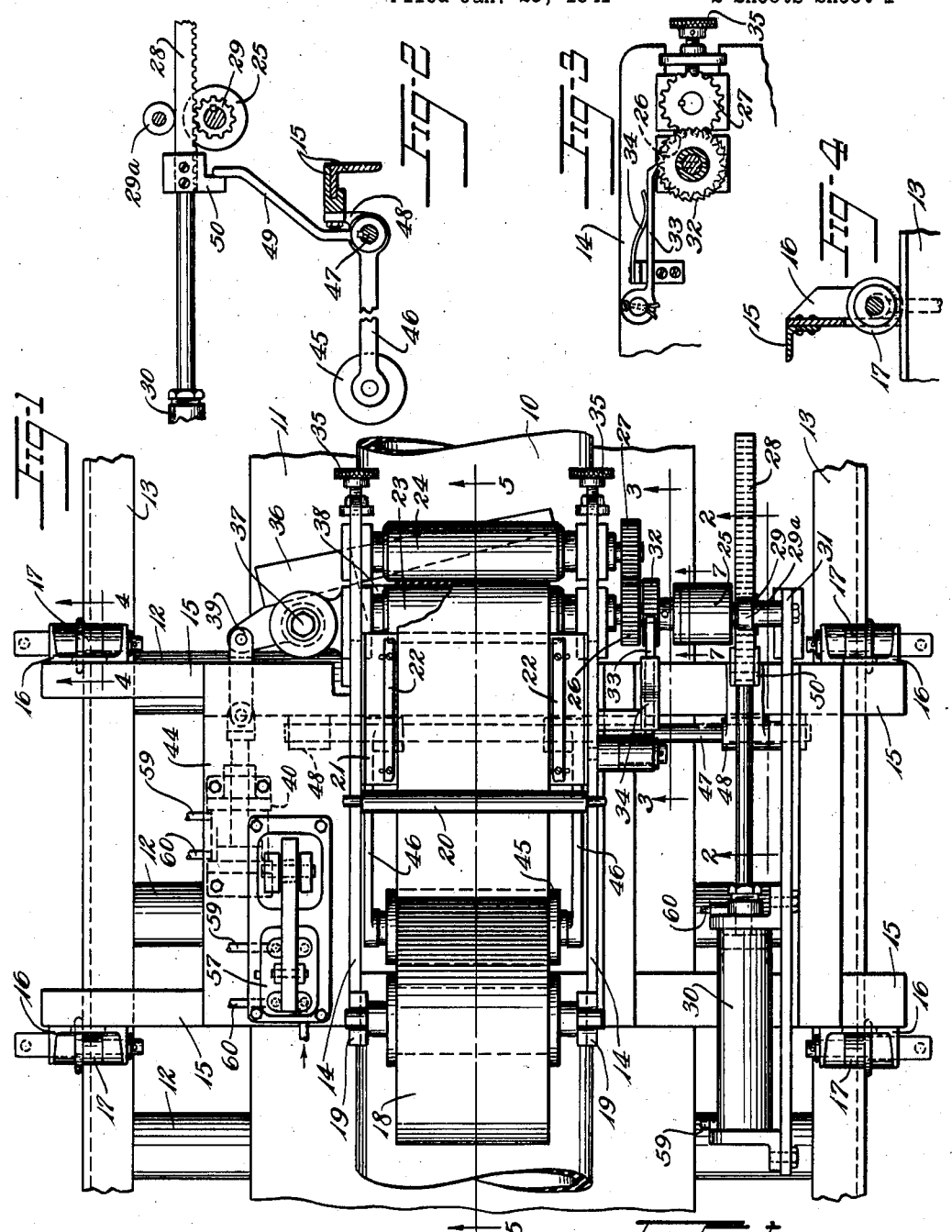
Inventor
Russell S. Colley
By Willis F. Avery
Atty.

June 13, 1944.      R. S. COLLEY      2,351,404
PATCH APPLYING APPARATUS
Filed Jan. 29, 1941     2 Sheets-Sheet 2
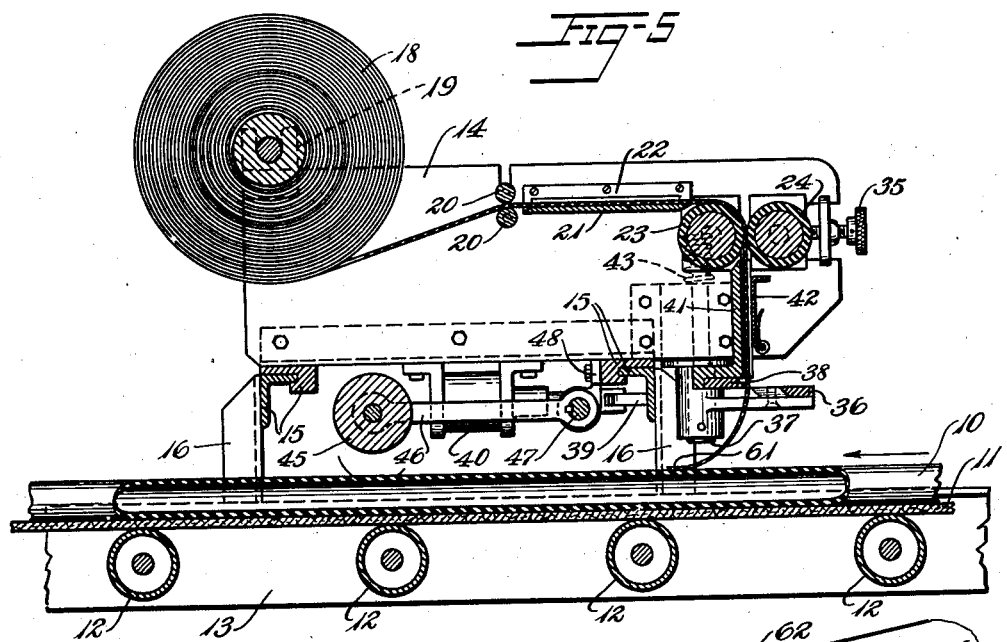
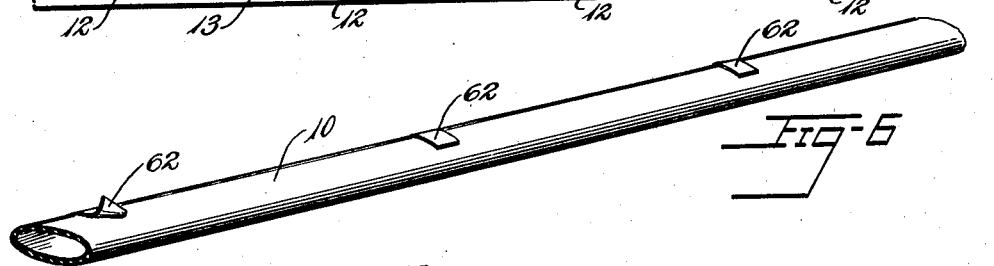
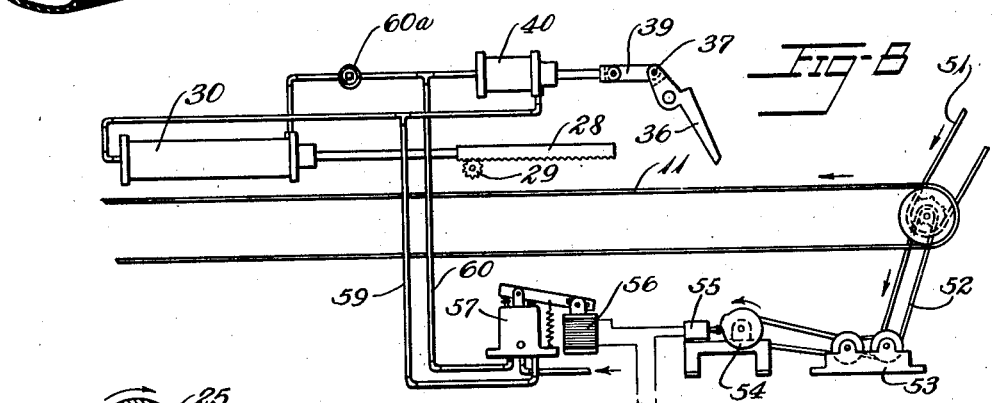
Inventor
Russell S. Colley
By Willis T. Avery
Atty.

Patented June 13, 1944

2,351,404

UNITED STATES PATENT OFFICE 2,351,404

PATCH APPLYING APPARATUS

Russell S. Colley, Kent, Ohio, assignor to The B. F. Goodrich Company, New York, N. Y., a corporation of New York Application January 29, 1941, Serial No. 376,451

4 Claims. (Cl. 154—9)

This invention relates to applying patches or pieces of sheet or strip material to a length of material and especially to the applying of temporary protective patches to continuous lengths of flexible tubing at spaced-apart positions along the same.

It is desirable to apply pieces of protective material on the surface of newly extruded rubber tubing temporarily at positions along the same where valve stems are subsequently to be adhered to prevent the possibility of accumulations of soapstone and other foreign matter on the gummy surface of the uncured rubber tubing prior to the application of valve stems thereto so that the tackiness of the tube surfaces on which valves are to be seated will be retained during passage of the same through a soapstone bath and during the handling of the tubing between the extrusion operation and the application of the valve stem.

The chief objects of the present invention are to provide apparatus and procedure for applying temporary pieces of strip material at positions along the surface of a length of material; to provide for applying patches at spaced-apart positions along a continuous length of tubing or the like; to provide for applying temporary patches smoothly at spaced apart positions along the surface of a long length of newly-extruded inner-tubing; to provide for speed and continuity of operation and to provide for economy and convenience of operation and maintenance.

These and further objects will be apparent from the following description, reference being had to the accompanying drawings in which:

Fig. 1 is a plan view of apparatus constructed in accordance with and embodying the invention in its preferred form.

Fig. 2 is a section taken along the line 2—2 of Fig. 1.

Fig. 3 is a section taken along the line 3—3 of Fig. 1.

Fig. 4 is a section taken along the line 4—4 of Fig. 1.

Fig. 5 is a section taken along the line 5—5 of Fig. 1.

Fig. 6 is a perspective view of a length of inner tubing showing patches applied by the apparatus.

Fig. 7 is a section taken along the line 7—7 of Fig. 1.

Fig. 8 is a diagrammatical view of the power transmission system of the apparatus.

Apparatus constructed in accordance with the invention is shown in assembly in Figs. 1 and 5 of the drawings. A length of unvulcanized inner tubing 10, or the like, to which protective patches are to be applied, is fed to the apparatus by a conveyor belt 11, or by other suitable conducting means. Undesirable adhesion between the inner walls of the tubing may be prevented by a suitable expedient, as for example, by blowing soapstone into the tubing or by partially inflating the same. The conveyor belt 11 is supported and guided on rollers 12, 12 which may be suitably mounted in frame members 13, 13, as shown, or otherwise suitably supported. The apparatus is mounted on vertical supporting members 14, 14 which are fixed to and supported by cross-frame members 15, 15. The apparatus may be movably mounted on the frame members 13, 13 by means of wheel brackets 16, 16 fixed to the cross-frame member 15, 15 and wheels 17, 17 adapted to travel on the frame members 13, 13, details of which are shown in Fig. 4, or the cross-frame members 15, 15 may be fixed to the frame members 13, 13 if desired.

The apparatus of the invention may be adapted to apply any suitable sheet material in patch or strip form. In the illustrative embodiment temporary protective patches are applied to uncured inner-tubing. A patch material possessing some tackiness and substantially no permanent adhesion to rubber or rubber-like material is desirable. It has been found that a material well-suited to the requirements is that known as Koroseal, which is a plasticized polyvinyl chloride.

A supply roll 18 of sheet material of the width desired for patches is disposed in a suitable manner, for example, in slotted-supports 19, 19 fixed to the vertical supporting members 14, 14. Means for guiding the patch material from the roll 18 to the point of application and for restraining lateral movement of the same may comprise a pair of small guiding rollers 20, 20, a platform 21, including guiding members 22, 22, and a pair of indexing rolls 23 and 24 adapted to feed the patch material to the surface of the inner-tubing 10, intermittently by means of an over-running clutch 25 operatively connected with the indexing roll 23 which is connected by means of gears 26 and 27, shown in Figs. 1 and 3, to the roll 24 and driven by a rack 28 through a pinion 29, the rack 28 being actuated by an air cylinder 30. A guiding roller 29a fixed to a vertical supporting member 31 may be desirable to maintain contact between the rack 28 and the pinion 29. The guiding means are mounted on the vertical supporting member 14, 14, as shown, and are adapted to reduce or eliminate any creasing or wrinkling of the sheet material as it is guided to the surface of the inner-tubing 10. The clutch 25 and the air cylinder 30 may be suitably fixed to the vertical supporting member 31, as shown in Fig. 1.

A suitable form of the clutch 25 is indicated in Fig. 7 of the drawings. Ratchet means comprising a ratchet wheel 32 and a pawl 33 movably fixed to the member 14 and held against the wheel 32 by a spring member 34, are shown in Fig. 3. The ratchet wheel 32 is rotatably connected with the roll 23 and the clutch 25 and the action of the pawl 33 thereon permits rotation of the rolls 23 and 24 in a manner to feed patch material to the point of application, while preventing reversal thereof.

Adjusting screws 35, 35 may be provided, if desired, to permit adjustment of the clearance between the indexing rolls 23 and 24 in accordance with the thickness of the sheet patch material used.

A movable knife blade 36 pivoted at a pin 37 is adapted to be actuated intermittently in a manner to engage a fixed knife blade 38. The blade 36 may be operated through an arm 39 by means of an air cylinder 40. Suitable guiding means, as guiding brackets 41 and 42 shown in Fig. 5 of the drawings, are desirable to direct the sheet patch material between the knife blades 36 and 38 from the indexing rolls 23 and 24 and hold the same firmly while the knife blades 36 and 38 are engaged to cut a patch from the sheet material. The pin 37 is fixed to one of the vertical supporting members 14 and may be adapted to receive a spring 43, which is desirable to maintain shearing action between the blades 36 and 38. The air-cylinder 40 is fixed to a table 44 mounted on the cross-frame members 15, 15.

A pressure roll 45 is held by arms 46, 46 which are pivotally mounted on a shaft 47 fixed to a cross-frame member at 48, 48. A lever arm 49 is fixed with relation to the arms 46, 46 and the roll 45 and is adapted to move the roll 45 in a path such that the roll 45 will alternately contact and be removed from the surface of the tubing 10. The lever arm 49 is moved by contact with a finger member 50 mounted on the rack 28, shown in detail in Fig. 2, in a manner such that the roll 45 rides on the tubing 10 immediately following the cutting of the patch so that the patch is rolled into contact with the gummy surface of the newly-extruded inner-tubing 10.

A power transmission and control system adapted to provide for the desired operation of the apparatus is shown diagrammatically in Fig. 8 of the drawings. The conveyor belt 11 is driven by a transmission belt 51 which may also drive a second transmission belt 52 connected through a speed changer unit 53 to a cam 54. The cam 54 trips a switch 55 adapted to close the electrical circuit to a solenoid 56 which operates a four-way valve 57 adapted to distribute compressed air to the two air cylinders 30 and 40 through pipes 59 and 60.

In the operation of the apparatus compressed air is delivered through the pipe 59 to the head end of the cylinder 30 and the crank end of the cylinder 40. The rack 28 is driven outwardly from the cylinder 30 and the rolls 23 and 24 are rotated through the pinion 29 by the rack 28 to advance a length of the sheet patch material past the knife blades 36 and 38 and the movable knife blade 36 is removed a distance from the fixed blade 38 by the cylinder 40 to eliminate the possibility of interference between the advancing sheet material and the movable blade 36. The finger 50 on the rack 28 engages the lever arm 49 of the pressure roll 45 near the end of the rack movement as the rack is moved outwardly from the cylinder 30 and the pressure roll is lifted slightly from the surface of the tubing 10 to relieve the tubing from tension.

The sheet material thus fed between the knife blades 36 and 38 is disposed in a manner such that the free-end contacts the gummy surface of the length of inner-tubing 10 being continuously conducted thereunder, as indicated at 61 in Fig. 5, so that the sheet material to be cut is urged by contact with the tacky surface of the moving tubing toward a partially flattened disposition with respect to the tubing 10 which is the position of the parts shown in Fig. 5. When the patch is cut it will drop flat against the tubing 10.

Compressed air is then delivered through the supply pipe 60 to the crank end of the cylinder 30 and the head end of the cylinder 40. The rack 28 is drawn inwardly toward the air cylinder 30 and the rolls 23 and 24 are held stationary by the ratchet means as the pinion 29 is disconnected from the rolls 23 and 24 by means of the clutch 25. Simultaneously, the movable knife blade 36 is brought into shearing contact with the sheet material against the fixed knife blade 38 and a patch is cut. The patch thus cut drops into a position determined by the free-end which is already in contact with the gummy surface of the tubing as shown at 61 in Fig. 5.

As the rack 28 is drawn inwardly toward the cylinder 30, the finger 50 of the rack 28 releases the lever arm 44 and the pressure roll 45 connected therewith is lowered onto the inner tubing 10 to press the patch and the inner-tubing 10 into firm and uniform adhering relation, even though temporary, completing the cycle of operation. A new length of sheet material is subsequently fed out as the movable knife blade 36 is withdrawn and the pressure roll 45 is raised in continuous repetition of the cycle while patches are applied at spaced positions along the surface of the inner-tubing 10.

A spring-pressed valve 60a, operable to open when a predetermined pressure is reached, may be provided in the length of the pipe 60 which supplies the crank end of the cylinder 30 to delay slightly the feed of the strip 61 by rollers 23, 24 until the blade 36 is out of the way of the strip, this valve, when employed, also delays return of the rack 28 slightly with respect to operation of the cutting knife but since the roller 45 is dropped during the first phase of return movement of the rack and the tubing is conveyed at a relatively slow speed, the roller 45 drops before the patch passes thereunder.

A length of inner-tubing 10, with patches 62, 62 applied, appears as shown in Fig. 6. The patches are, in most cases, desirably of relatively slight tackiness such that firm sealing adhesion to the gummy surface of the newly formed inner-tubing 10 is provided, but adhesion of a temporary nature so that the patches may be conveniently removed when valve stems or the like are to be applied to the surfaces which the patches have protected during handling.

The indexing rolls 23 and 24 are preferably covered with rubber or the like to present frictional surfaces for contacting and pulling the sheet material from the supply roll 18. The desirable tackiness of the sheet material adds to the frictional surface contact of the indexing rolls 23 and 24 and the sheet material and also prevents over-running of the supply roll 18 by providing a desirable degree of resistance to unreeling.

The apparatus of the invention is adapted to be conveniently mounted between a tube extruding or other forming unit and the commonly employed soapstone bath for newly-formed tubing. The length of patches supplied to the surface of the tubing may be readily varied, as desired, by varying the length of travel of the rack 28 accordingly.

Variations may be made without departing from the scope of the invention as it is defined by the following claims.

I claim:

1. Apparatus for applying patches from patch material in extended length to strip material at spaced-apart positions along the same, said apparatus comprising means for advancing the strip material, means for delivering an end portion of the patch material downward into partially flattened disposition in contact with said strip material by intermittent movements, means below said delivering means for severing the end portion of the patch material between the intermittent movements to drop the patches upon the strip material, roller means for pressing said end portion into adhesive engagement with said strip material, and means operatively connected with the patch material delivery means for removing said roller means from the strip material between patch applications.

2. Apparatus for applying temporary protective patches from patch material in extended length to tubing of tacky rubber-like material at spaced-apart positions along the same to protect areas of the tacky surface thereof, said apparatus comprising means for advancing the tubing, means for delivering an end portion of the patch material downward into adhesive contact with the advancing tubing by intermittent movements in a manner such that the end portion of the patch material is carried along by the adhesive engagement with the tubing toward a partially flattened disposition of said portion of the patch material with respect to the surface of the tubing, means operated in timed relation with such movements for severing the end portion of the patch material between the intermittent movements to drop said portion upon the tubing, roller means for pressing said end portion into adhesive engagement with said tubing, and means connected with the patch material delivery means and operated in timed relation therewith for removing said roller means from its pressing position between patch applications.

3. Apparatus for applying temporary protective patches from patch material in extended length to strip material at spaced-apart positions along the same, said apparatus comprising means for advancing the strip material, means for delivering an end portion of the patch material downward into adhesive contact with the advancing strip material in a manner such that the end portion of the patch material is carried along by the adhesive contact with the strip material with respect to the surface of the strip material, means operated in timed relation with the advance of the strip material for severing the end portion of the patch material to drop said portion upon the strip material, roller means for pressing said end portion into adhesive engagement with said strip material, and means connected with the patch material delivery means and operated in timed relation therewith for removing said roller means from its pressing position between patch applications.

4. Apparatus for applying adhesive patches from patch material in extended length to strip material at spaced-apart positions along the same, said apparatus comprising means for advancing the strip material, means for delivering an end portion of the adhesive patch material downward into adhesive contact with the advancing strip material in a manner such that the end portion of the strip material is carried along by the adhesive contact with the strip material with the surface of the strip material, means operated in timed relation with the advance of the strip material for severing the end portion of the thus advanced patch material to drop the trailing end of said portion upon the strip material, means for pressing said end portion into adhesive engagement with said strip material, and means connected with the patch material delivery means and operated in timed relation therewith for removing said pressing means from its pressing position between patch applications.

RUSSELL S. COLLEY.